United States Patent [19]

Miller

[11] 3,919,037

[45] Nov. 11, 1975

[54] OPTICAL FIBER SPLICING APPARATUS

[75] Inventor: Calvin Max Miller, Lilburn, Ga.

[73] Assignee: Bell Telephone Laboratories, Incorporated, Murray Hill, N.J.

[22] Filed: Nov. 7, 1974

[21] Appl. No.: 521,656

[52] U.S. Cl. ............... 156/502; 156/158; 156/296; 156/304; 350/96 B
[51] Int. Cl.² ........................................ B65H 69/06
[58] Field of Search ............ 29/464, 466, 467, 468, 29/474.4, 203 J, 203 P; 156/158, 161, 166, 304, 502, 494, 296, 459, 460; 350/96 E, 96 C; 65/4

[56] References Cited
UNITED STATES PATENTS

| | | |
|---|---|---|
| 3,614,415 | 10/1971 | Edelman ............................ 350/96 B |
| 3,674,013 | 7/1972 | Polanyi .............................. 350/96 B |
| 3,768,146 | 10/1973 | Braun et al. ....................... 350/96 B |
| 3,810,802 | 5/1974 | Buhite et al. ...................... 156/304 |
| 3,864,018 | 2/1975 | Miller ..................................... 65/4 |

*Primary Examiner*—William A. Powell
*Assistant Examiner*—Brian J. Leitten
*Attorney, Agent, or Firm*—C. E. Graves

[57] ABSTRACT

Single or arrayed pairs of optical are axially aligned and abutted preparatory to splicing by introducing the fibers to be mated into opposite ends of an elongated optical fiber receiving cavity, at a slight angle with respect to the cavity's axis and in the same plane of travel.

5 Claims, 5 Drawing Figures

OPTICAL FIBER SPLICING APPARATUS

FIELD OF THE INVENTION

The present invention is concerned with the construction and maintenance of an optical fiber transmission medium. More specifically, it relates to a method of splicing one or more pairs or an arrayed pair of optical fibers under plant or field conditions.

BACKGROUND OF THE INVENTION

The potential advantages of transmitting information via optical fiber light transmission medium are widely recognized in the data transmission industry. However, the problem of an optical fiber splicing remains a hindrance to the maximum development of this valuable medium.

An objective of the present invention is to provide a method to construct low loss optical fiber splices in a field or plant environment. Still another objective of the present invention is to introduce flexibility into the communication system by making it possible to use an appropriate method consistent with the particular problem faced.

Still another object of the present invention is to take advantage of commercially available, low-cost materials so as to make optical fiber splicing feasible in situations where it may not be otherwise.

SUMMARY OF THE INVENTION

Pursuant to the invention, single or linear arrayed pairs of optical fibers to be mated are axially aligned and abutted preparatory to splicing by use of an elongated optical fiber receiving cavity into which the fibers are introduced at a slight angle to the cavity axis. The fibers hug the floor of the cavity because of the bending stress thus generated. Also, the fibers are introduced in the same plane of travel so that the fiber ends will, on full insertion meet and abut in axial alignment.

In another embodiment, respective ones of a pair of optical fibers to be mated are entered into the opposing ends of a receiving cavity in the same plane and advanced therein until the respective fiber ends are a short distance apart. The receiving cavity is then adjusted laterally so as to cause said fibers to bend against the cavity wall, thereby biasing the fibers by their own stiffness. The fibers are then moved toward each other into abutment.

Arrayed pairs of optical fibers may be similarly abutted and spliced. Here, the optical fiber receiving cavities are secured and spaced so as to have the same center-to-center distance as that of the arrayed fibers.

DESCRIPTION OF THE ILLUSTRATIVE EMBODIMENTS

Figure 1:
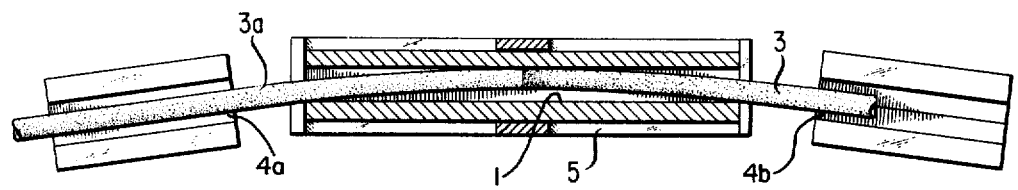
FIG. 1 illustrates a cross-sectional view of an abutted fiber in the receiving cavity.

As illustrated in FIG. 1, an elongated receiving cavity, designated 1, has an interior circumference slightly larger than that of the optical fiber 3, thus permitting a loose fit. The cavity shown is circular; but other shaped cavities such as diamond, rectangular, triangular, elliptical and other, may be used also in the practice of the invention.

As mentioned, the fibers are introduced into the cavity at a slight angle.

The angle, designated $\theta$ should be sufficiently large to develop bending stress in each fiber sufficient to cause it to lightly lodge against the cavity wall. The exact angle used in a particular case will depend to an extent on the ratio of the diameter of the fibers to the diameter capacity of the cavity, and the fiber stiffness.

Figure 2:
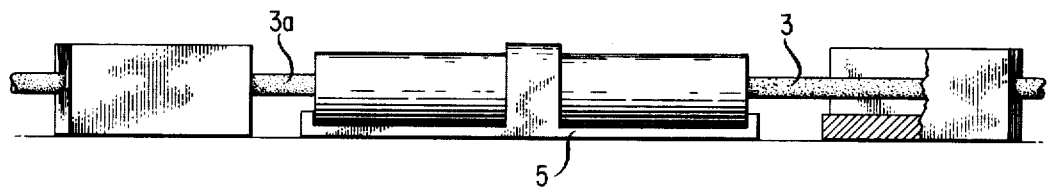
FIG. 2 depicts the holding and aligning apparatus containing the receiving cavity.

The angle $\theta$ may be created by either inserting the fibers at the angle $\theta$ or by inserting the fibers axially coincident with the cavity as in FIG. 2, and creating angle $\theta$ by displacing the cavity in a direction perpendicular to the fibers' axis so as to cause the fibers to bias against and lodge along the cavity's walls. In the FIG. 1 embodiment the fibers are inserted by first placing the two fibers 3, 3a into the fiber guides 4a and 4b and inserting the fibers 3, 3a into the receiving cavity 1. The fiber guides 4a and 4b are oriented with respect to the cavity 1 so as to cause the advancing fiber to be disposed in the same plane of travel and to be inserted into opposing ends of said cavity at a slight angle $\theta$.

The splicing is completed by causing index matching eposy to cure in and around the abutted joint. The epoxy may be flowed into the cavity prior to inserting the fiber or inserted under pressure or by other means after fiber insertion.

Figure 4:
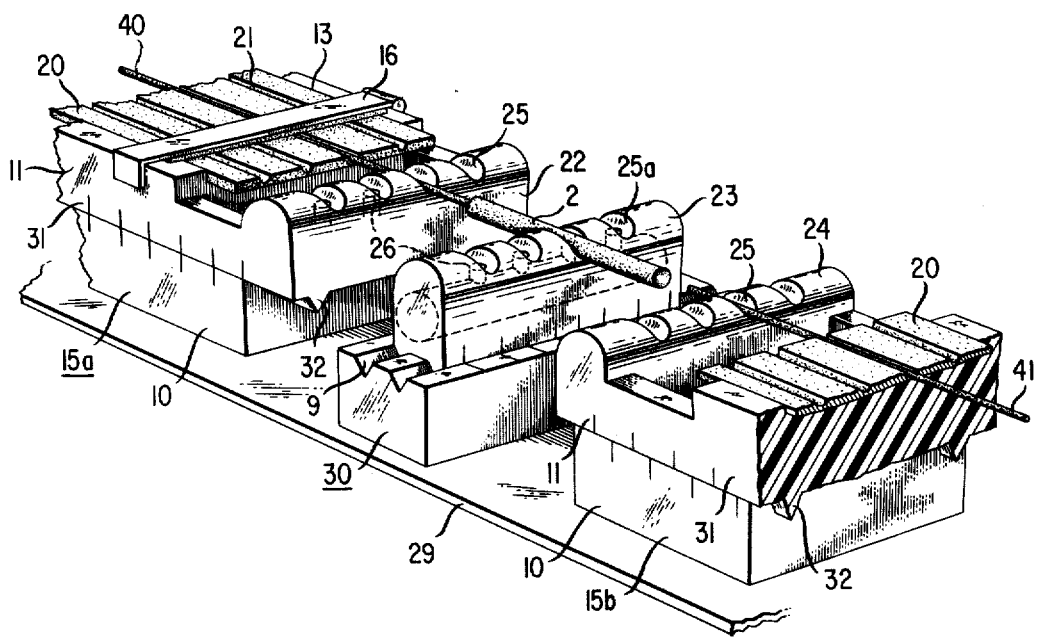
FIG. 4 is an illustration of the splicing apparatus being utilized to splice a pair of fibers.

Several individual pairs or arrayed pairs of optical fibers may be abutted in axial alignment by utilizing the apparatus illustrated in FIG. 4. The apparatus comprises an assembly baseplate 29 to which other members of the apparatus are attached. The optical fiber guide assembly 15a and 15b located on either side of the cavity holding assembly 30 are utilized to guide the fibers in axial alignment into a receiving cavity, such as cavity 2, only one of which is shown for simplicity. Each optical fiber guide assembly 15a, 15b is comprised of an upper and lower guide assembly plate 10 and 11, which are interlocked together by the male-female interlocking guide track 32. The respective upper guide assembly plates 11 are equipped with vacuum chucks 22 and 24 and fiber holding plates 20 containing fiber holding grooves 21 along the top surface and holding clamps 16. The vacuum chucks contain along their top surface one or more V-shaped fiber holding grooves 25. A third vacuum chuck 23 is mounted on assembly 30 and includes grooves 25a which may be placed in alignment with the grooves 25. The vacuum chuck 23 is transversely positioned by the male-female interlocking guide track 9.

Two fibers 40, 41 are placed respectively in the holding grooves 21 and secured therein by fiber holding clamp 16 (only one shown) located on both optical fiber guide assemblies 15a and 15b. The ends of the fibers are retained in the holding grooves 25 by vacuum pressure exerted on the fibers through vacuum valves 26. The fiber ends are extended beyond the fiber holding grooves 25 a short distance. The receiving cavity 2 is then placed in the cavity holding grooves 25a and held therein by vacuum pressure exerted through vacuum passages 26 which are connected to a vacuum source, not shown. The receiving cavity 2 is axially aligned and held by adjusting vacuum chuck 23 along the male-female interlocking guide track 9.

The exact distance between the fiber ends and the cavity's midway point is then determined by measurement means such as the distance scale 31 located on the side surfaces of the respective upper and lower guide plates 10 and 11 of the respective fiber guide assemblies 15a and 15b. When one-inch length receiving cavities are used, for example, the fiber ends are normally extended one-half inch beyond the holding grooves 25. Thus, the total distance at the upper guide assemblies plate 10 of the respective fiber guide assemblies 15a and 15b must travel for approximately one-half inch from the recessed starting position in order to achieve abutment.

After the optical fibers 3 have been seated into their advanced holding grooves 25, which are axially aligned with the center of the receiving cavity, the guide assembly plates 10 of both fiber guide assemblies 15a and 15b are then advanced toward each other until said fiber ends are a short distance apart, as indicated on distance scale 31. Vacuum chuck 23 is then moved along male-female interlocking guide tracks 9 in a direction perpendicular to the fibers' axis so as to cause said fibers to be biased against and lodged along the cavity walls, creating the angle θ as illustrated in FIG. 1. The respective guide assembly plates 10 are then further advajced until the fibers are abutted. The splice is completed by causing index matching epoxy to cure in and around the joint. The receiving cavity is retained as part of the completed splice.

Figure 3:
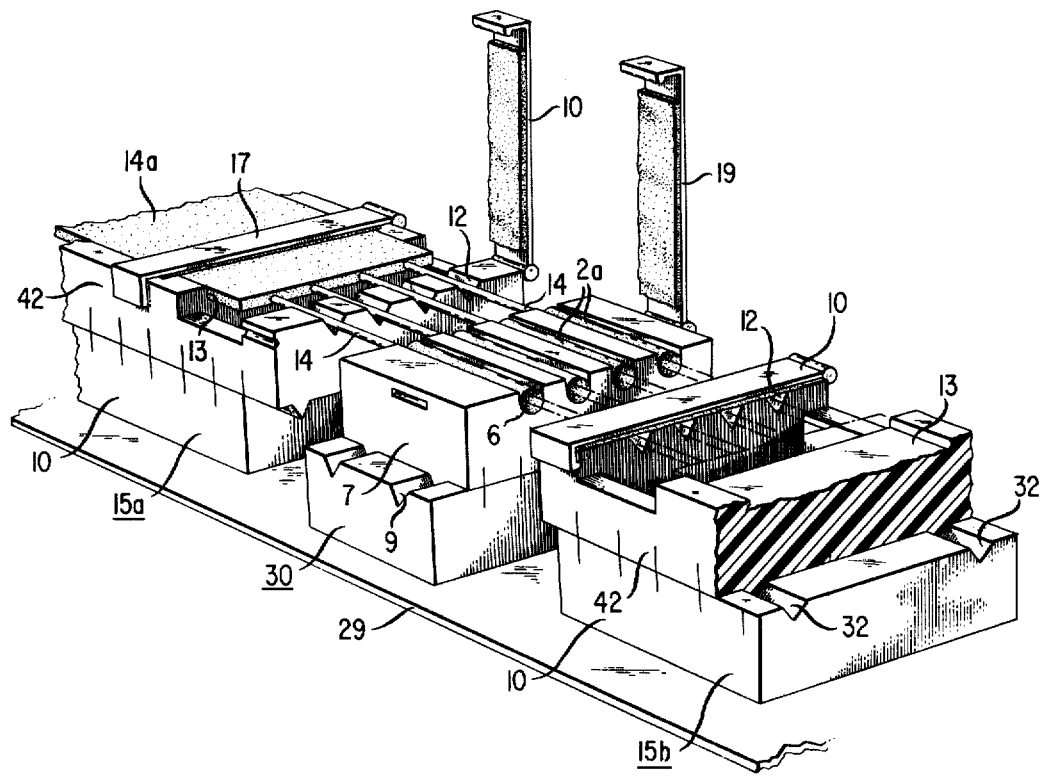
FIG. 3 illustrates the multisplicing apparatus with an array of optical fibers contained therein.

Pairs of arrayed optical fibers in ribbon structures may be similarly spliced as illustrated in FIG. 3. This embodiment utilizes V-shaped guide grooves 12 contained along a top surface of each upper guide plate 42. It also utilizes cavity alignment recesses 6 located along the top surface of alignment plate 7. The cavities denoted 2a are secured in cavity recesses by cavity holding clamp 19. The fiber ribbon structure 14a is first placed in ribbon guide 13 and is secured by clamp 17. Arrayed optical fibers 14 of ribbon structure 14a are then placed in array guide slots 12. Fiber seating and holding clamp 10 is secured. Caution should be exercised when splicing arrayed fibers to assure that the individual fiber ends are even with respect to each other and are extended equal distances approximately a distance equal to that of, in this case, opne-half inch, from the guide plate 42. The fibers are then abutted and spliced in accordance with the above-stated procedure.

An advantage of the apparatus here utilized is that fiber abutment is greatly facilitated because the distance each fiber must be advanced in the abutment process is readily predetermined. Also, when transparent receiving cavities are utilized the actual abutment may be obserbed with the aid of a microscope.

Figure 5:
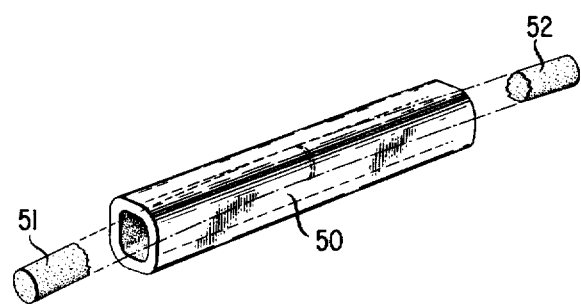
FIG. 5 is a front perspective view of an alternate fiber-receiving cavity.

The receiving cavity 1 is advantageously an elongated tubelike enclosed structure, continuous with respect to either end and with a circumference slightly larger than that of the optical fibers. Other cavity shapes may be readily envisioned. FIG. 5 illustrates one such further shape consisting of a glass or transparent plastic square tubing. The fibers 51, 52 are abutted in a selected corner of the square tubing 50.

In all cases, however, it should be realized that the embodiments here illustrated are not intended in any way to be limiting. Thus various other arrangements can readily be devised in accordance with the teaching of the present invention by those skilled in the art without departing from the spirit and scope of these principles.

What is claimed is:

1. An apparatus for abutting a mating pair of optical fibers comprising:
   an elongated optical fiber receiving cavity which is continuous with respect to either end, having a circumference slightly larger than that of said fibers,
   means for inserting in the same plane of travel respective ones of said mating pair of optical fibers into opposing ends of said receiving cavity,
   means for adjusting the fiber-to-cavity wall separation so that said fibers are biased against and lodged along said cavity wall, and
   means for further inserting said fibers into said cavity so that said fiber ends are brought into axial alignment and abutment.

2. The apparatus described in claim 1 wherein said receiving cavity is cylindrical.

3. The apparatus described in claim 1 wherein said inserting means are effective to insert said ones of said pair of fibers in axial alignment with the center of said cavity's circumference.

4. The apparatus for the joining of individual fibers of a first array of optical fibers to the respective fibers of a second array of optical fibers comprising:
   a plurality of elongated optical fiber receiving cavities, each said cavity being continuous with respect to either end,
   means for axially aligning said fibers with the center of the respective cavities' circumference,
   means for inserting respective ones of said fibers into opposing ends of said cavities and advancing said fiber therein until said fiber ends are a short distance apart,
   means for displacing said cavities in a direction perpendicular with respect to the axes of said fibers, and
   means for further inserting said fibers into said cavity so that said fiber ends are brought into abutment.

5. The apparatus described in claim 1 wherein said inserting means are effective to insert said fibers into said cavity at a slight angle so as to cause said fiber to bias and lodge along said cavity wall.

* * * * *